United States Patent
Ellis

(10) Patent No.: US 10,025,351 B2
(45) Date of Patent: Jul. 17, 2018

(54) SYSTEM FOR CONTROLLING PERIPHERALS CONNECTED TO A DOCKING STATION

(71) Applicant: DisplayLink (UK) Limited, Cambridge (GB)

(72) Inventor: Dan Ellis, Cambridge (GB)

(73) Assignee: DisplayLink (UK) Limited, Cambridge (GB)

( * ) Notice: Subject to any disclaimer, the term of this patent is extended or adjusted under 35 U.S.C. 154(b) by 217 days.

(21) Appl. No.: 14/795,483

(22) Filed: Jul. 9, 2015

(65) Prior Publication Data
US 2016/0124463 A1 May 5, 2016

(30) Foreign Application Priority Data

Nov. 4, 2014 (GB) .................................. 1419653.9

(51) Int. Cl.
| | | |
|---|---|---|
| G06F 1/16 | (2006.01) | |
| G06F 13/40 | (2006.01) | |
| G06F 1/20 | (2006.01) | |
| G06F 1/26 | (2006.01) | |

(52) U.S. Cl.
CPC ............ *G06F 1/1632* (2013.01); *G06F 1/203* (2013.01); *G06F 1/266* (2013.01); *G06F 13/4081* (2013.01)

(58) Field of Classification Search
None
See application file for complete search history.

(56) References Cited

U.S. PATENT DOCUMENTS

| 5,386,567 A | * | 1/1995 | Lien ..................... G06F 9/4411 710/302 |
|---|---|---|---|
| 2004/0088465 A1 | | 5/2004 | Bianchi |
| 2014/0344494 A1 | | 11/2014 | Zeung et al. |

FOREIGN PATENT DOCUMENTS

| GB | 2394080 A | 4/2004 |
|---|---|---|
| WO | WO 2008/131486 A1 | 11/2008 |

* cited by examiner

*Primary Examiner* — Idriss N Alrobaye
*Assistant Examiner* — Dayton Lewis-Taylor
(74) *Attorney, Agent, or Firm* — Mu P.C.

(57) ABSTRACT

A method for determining which of a plurality of mobile devices connected to the docking station is permitted to control the peripherals involves the docking station determining whether a new mobile device is connected to an input port of the docking station, and, if so, whether the new mobile device is capable of controlling any of the peripherals connected to the docking station. If it is determined that the new mobile device is not capable of controlling any of the peripherals, the docking station determines that the new mobile device is to be connected as a peripheral. If it is determined that the new mobile device is capable of controlling one or more of the peripherals, the docking station determines whether an existing mobile device connected to the docking station has control of the peripherals as a host device, and, if so, determining which of the new mobile device or the existing mobile device has a higher priority to control the peripherals as the host device, and providing the determined host device access to control the peripherals.

17 Claims, 4 Drawing Sheets

SYSTEM FOR CONTROLLING PERIPHERALS CONNECTED TO A DOCKING STATION

The invention relates to a method and apparatus for controlling peripherals connected to a docking station, more particularly, for determining which of a plurality of mobile devices connected to the docking station is permitted to control the peripherals.

BACKGROUND

Under current art, a device is able to connect to a docking station that may have multiple peripherals attached to it, such as a keyboard, mouse, display, etc. While docked, the device is able to charge any battery it may have, assuming that the dock is powered in some way, and also use the peripherals for input and output. Such a device that controls the peripherals is known as the host device.

Some devices, such as most currently available laptops automatically act as host devices as soon as they are connected to a docking station. This is due to the hardware, such as the connection ports available, or due to the software installed in the laptop. For example, most current laptops only have Type-A USB connection ports. According to current USB technology, the Type-A end of a USB cable must be connected to the host device and cannot be functionally connected to a peripheral. Similarly, some devices, such as external hard drives, are only able to act as peripherals. Again, this limitation may be imposed by hardware, such as the provision of a Type-B socket for a USB cable, or by software.

There are also devices that are able to act both as hosts and peripherals, following the USB OTG protocol. For example, many smartphones can act either as host devices in their own right or as external storage when connected to a host device such as a laptop. Their mode of operation is dictated by the state of the ID pin which only exists on the micro connectors, but not the standard connectors and so doesn't have a corresponding wire in a normal USB cable. If the connector leaves this pin floating, then the OTG device remains in peripheral mode, but if the pin is pulled to ground then the OTG device is connected to the connector in host mode.

A new Type-C USB connector functions such that either end can be connected to either one of a host or a peripheral. There may still be limitations on a device's behaviour based on its own capabilities, or it may switch its role for itself. In the USB Type-C case, the host and peripheral are identified by the voltage on a CC connection while the connection between the devices is being detected. This voltage difference is created by the use of pull-up resistors, which raise the voltage, and pull-down resistors, which lower it. If one device ("Device 1") detects a low voltage on the CC connection with the other device ("Device 2"), Device 1 knows that Device 2 is to connect as a peripheral device. Likewise, if Device 2 detects a high voltage on the CC connection with Device 1, it knows that Device 1 is to act as host device. A dual-mode device automatically switches between its pull-up and pull-down resistors during connection until it finds a mode that is compatible with the device to which it is connected.

Presently known USB docking stations have a single upstream USB Type-B port into which a Type-B plug can be inserted with a Type-A plug on the other end of the USB cable being plugged into a USB Type-A port on the device, such as a laptop. Docking stations are also commonly used to charge mobile phones from their downstream USB ports.

However with the increase in computational power in mobile phones, and utilising the OTG protocol, mobile phones can become hosts in themselves, that is, a mobile phone could be plugged into the upstream USB Type-B port of the docking station and control the workstation peripherals instead, whilst also charging at the same time.

However, if a user has a phone plugged into the USB Type-B port of the docking station, and then wants to utilise the increased capabilities of a laptop device, the phone will have to be unplugged from the USB Type-B port so that the laptop can be plugged into it, and if it is to continue charging, the mobile phone will then have to be plugged into a downstream USB Type-A port in the docking station. This is not convenient for the user.

SUMMARY OF THE INVENTION

The aim of the invention is to reduce the above mentioned problems of the prior art.

According to a first aspect, there is provided a method for controlling access to one or more peripherals connected to a docking station by a host device connected to the docking station, the method comprising:

determining, by the docking station, when a new mobile device is connected to an input port of the docking station;

when a new mobile device is determined to be connected to the input port of the docking station, determining, by the docking station, whether the new mobile device is capable of controlling one or more peripherals connected to the docking station;

if it is determined that the new mobile device is not capable of controlling the one or more peripherals connected to the docking station, determining that the new mobile device is to be connected as a peripheral;

if it is determined that the new mobile device is capable of controlling the one or more peripherals connected to the docking station, determining whether an existing mobile device connected to the docking station has control of the peripherals as a host device;

if it is determined that an existing mobile device connected to the docking station has control of the peripherals as a host device, determining which of the new mobile device or the existing mobile device has a higher priority to control the peripherals as the host device; and providing the determined host device access to control the peripherals.

Preferably, if it is determined that the new mobile device should be the host device, changing the connection of the existing mobile device to be connected as a peripheral. If it is determined that the new mobile device should be the host device, charging capabilities are preferably maintained for the existing mobile device by the docking station. Preferably, if it is determined that the existing mobile device should be the host device, continued access to control the peripherals is provided for the existing mobile device. If it is determined that the existing mobile device should be the host device, the new mobile device is preferably connected as a peripheral. If it is determined that the existing mobile device should be the host device, the new mobile device is preferably provided charging capabilities by the docking station.

In one embodiment, determining whether an existing mobile device connected to the docking station has control of the peripherals as a host device comprises:

checking whether the existing mobile device is executing an ongoing process; and if it is determined that the existing mobile device is executing an ongoing process, and that the new mobile device should be the host device, delaying providing the new mobile device as host device access to control the peripherals until the existing mobile device has completed execution of the ongoing process.

Preferably, if it is determined that the new mobile device should be the host device, the method comprises requesting confirmation from a user of the existing mobile device that access to control the peripherals should be withdrawn from the existing mobile device, and delaying withdrawal of access to control the peripherals from the existing mobile device until such confirmation has been received.

According to a second aspect, the invention provides a method for controlling access to one or more peripherals connected to a docking station by a host device connected to the docking station, the method comprising:

determining, when a mobile device is disconnected from an input port of the docking station, whether the disconnected mobile device was acting as a host device controlling the one or more peripherals connected to the docking station;

when a mobile device acting as a host device is determined to have been disconnected from the input port of the docking station, determining whether any other mobile device capable of controlling the one or more peripherals is connected to an input port of the docking station;

if it is determined that more than one mobile device capable of controlling the one or more peripherals is connected to the docking station, determining which of the connected mobile devices capable of controlling the one or more peripherals has a higher priority for acting as a host device; and providing the highest priority connected mobile device access to control the peripherals as the host device.

Preferably, the priority of the mobile devices to control the peripherals as the host device is determined based on attributes of each of the mobile devices. The priority of the mobile devices to control the peripherals as the host device may be determined based on user input or on a preset priority of each of the mobile devices. The preset priority of each mobile device may be stored in the corresponding mobile device or in the docking station. The priority of the mobile devices to control the peripherals as the host device may be determined based on which of a plurality of different input ports each mobile device is connected to.

According to a third aspect, the invention provides a docking station comprising a plurality of output ports for connection to one or more peripherals, a plurality of input ports for connection to one or more mobile devices, and a controller for controlling access to the one or more peripherals connected to the output ports and configured to perform a method as described above.

In one embodiment, the controller comprises a main switch, a hub coupled to the main switch and to the plurality of output ports, and a plurality of preliminary switches, each preliminary switch coupled to an input port, the main switch and the hub. Preferably, a first preliminary switch determines when a mobile device is newly connected to an input port of the docking station and whether the mobile device is capable of acting as a host device and, if so, activates a connection between the input port and the main switch, the main switch determines whether an existing mobile device is connected to an input port of the docking station and has control of the peripherals as a host device, if it determines that an existing mobile device is connected to the docking station as a host device, determines whether the existing mobile device or the newly connected mobile device has a higher priority to act as the host device and, if it determines that the newly connected mobile device has the higher priority to act as the host device, it controls the preliminary switch connected to the input port to which the existing mobile device is connected, to connect the input port to which the existing mobile device is connected to the hub, whereby the existing mobile device no longer has control of the peripherals.

According to a fourth aspect, the invention provides a computer readable medium including executable instructions which, when executed in a processing system, cause the processing system to perform all the steps of a method as described above.

DETAILED DESCRIPTION OF THE DRAWINGS

Figure 1:
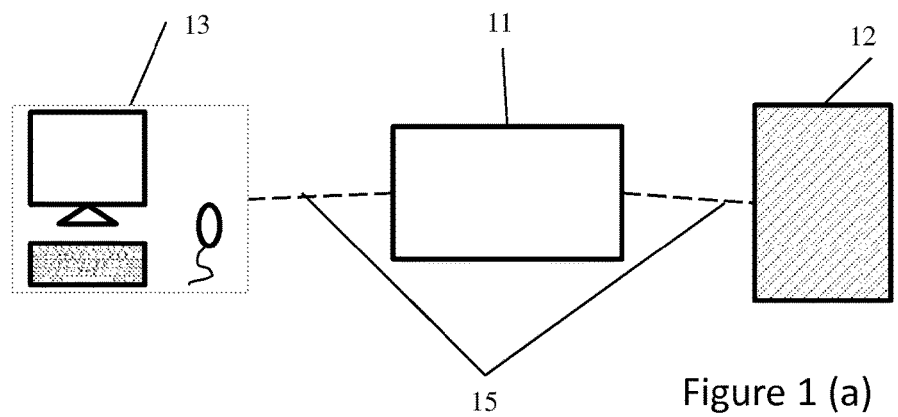
FIGS. 1(a) to 1(c) are diagrams showing several stages of operation of an example embodiment of the present invention in use.
Figure 1:
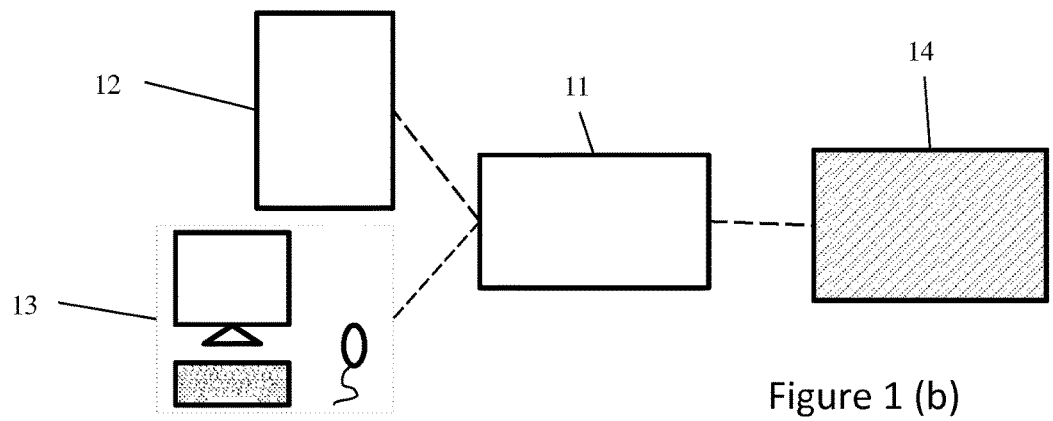
Figure 1:
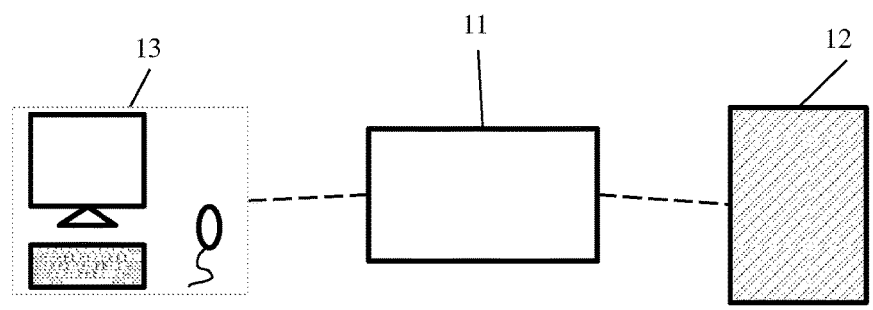

FIG. 1 shows an embodiment in which there is a first mobile device (which will be hereinafter referred to as the "Tablet") [12] attached to a docking station [11] and acting as a host device. The Tablet [12] is able to communicate with a number of peripherals [13] that are also attached to the docking station [11]. These may include a display, a keyboard, a mouse, external storage, a network connection, or any other suitable peripheral that may be so connected to the docking station and be utilised by the host device, but they are shown as a single unit for clarity. A connection [15] between, on the one hand, the docking station [11] and the host device [12] and, on the other hand, the docking station [11] and the peripherals [13] can be a wired connection, for example, a standard USB connection or can be wireless through Wi-Fi or any other suitable wireless connection. In the drawings, the device that is acting as the host device is denoted with hatched shading.

Thus, in a first stage of operation (shown FIG. 1(a)), the Tablet [12] is acting as the host device. It is also charging from the dock [11], which, in this embodiment, is attached to mains power (not shown).

In a second stage of operation, (shown in FIG. 1(b)), a user has connected a second mobile device that also has host capabilities (hereinafter the "Laptop") [14] to an input port of the docking station [11]. The docking station [11] detects the connection of the Laptop [14] via a handshaking procedure appropriate to the connection, determines whether the Laptop should be connected as the host device, and, if so, sends a signal to the Tablet [12] that it should disconnect as the host device. However, although the Tablet [12] no longer has communication with the peripherals [13], it is not unplugged from the docking station [11] and is connected as a peripheral device, so that it continues to charge, if appropriate, with only momentary interruption, and, further, can be controlled by the Laptop [14] as another peripheral. The Laptop [14] becomes the host device and takes over control of the peripherals [13].

As shown in FIG. 1(c), if the user then disconnects the Laptop [14], the docking station [11] detects the disconnection of the Laptop [14] and sends a signal to the Tablet [12] that it should once again use its host capabilities, so that the Tablet [12] becomes the host device again.

Figure 2:
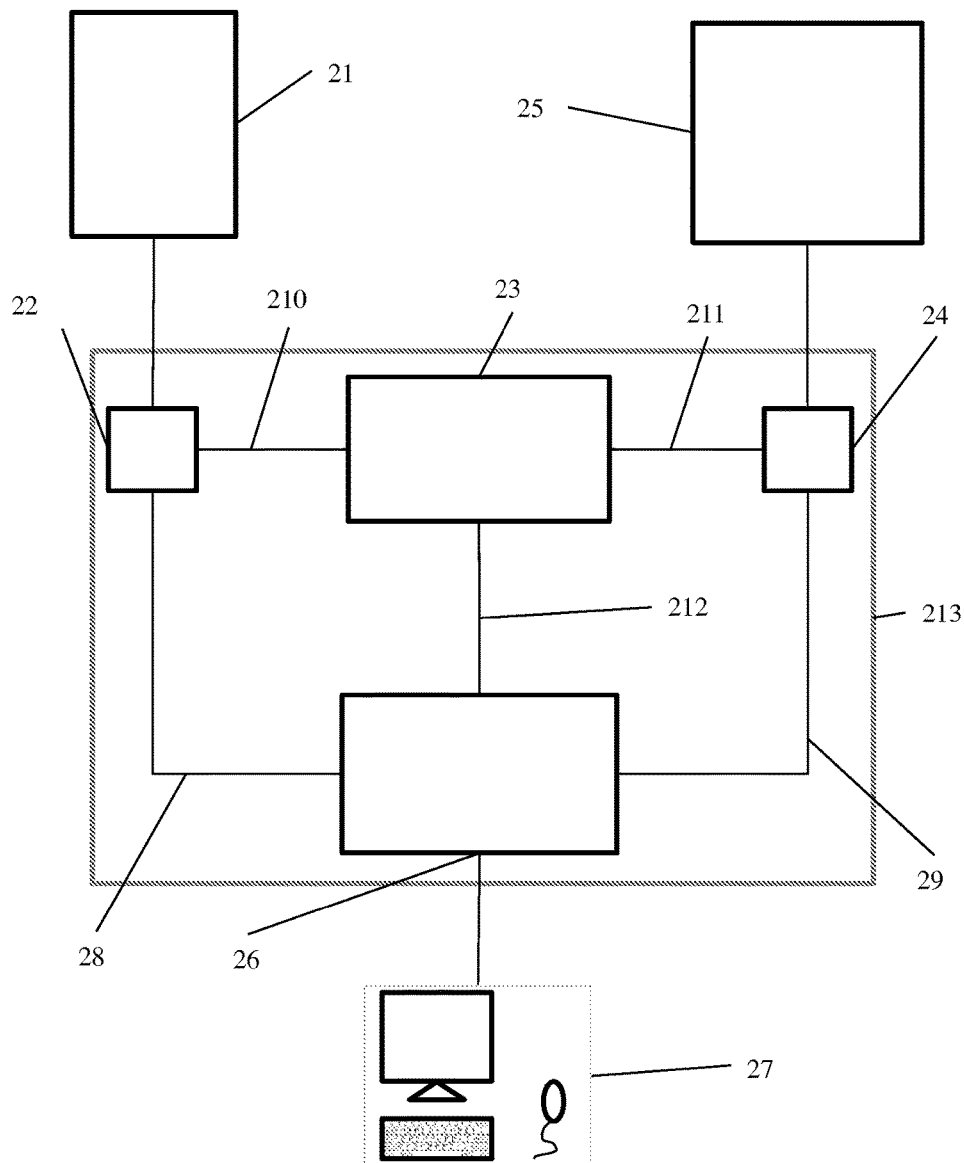
FIG. 2 is a basic schematic of an example embodiment of the invention.

FIG. 2 shows a basic schematic of an example embodiment of the invention. A first host device (the "Phone") [21] is connected to a docking station [213]. The docking station comprises, in this embodiment, a number of input ports, which may be USB Type-C ports, or may include one USB Type-A port; a series of preliminary switches [22, 24], one for each input port; a main switch [23]; and a hub [26], with connections [28, 29] between the preliminary switches [22, 24] and the hub [26], connections [210, 211] between the preliminary switches [22, 23] and the main switch [23] and a connection [212] between the main switch [23] and the hub [26]. One or more peripherals [27] are plugged into the hub [26]. As explained above, the device acting as the host device controls the peripherals [27] via the main switch [23] and the hub [26]. The hub [26] has a single upstream port through which control of the peripherals is performed, and the main switch [23] is connected via connection [212] to this upstream port of the hub [26]. The peripherals [27] are connected to downstream ports of the hub [26] which also has several further downstream ports to which mobile devices, not acting as a host device, can be connected via connections [28, 29].

In this embodiment, the peripherals [27] and the Phone [21] (and any other devices) are connected to the docking station [213] by micro-USB cables, but they may be connected by any other suitable wired or wireless method. In one embodiment, the preliminary switches [22, 24] and the main switch [23] may form part of the hub [26] such that a single port of the hub [26] is capable of changing its functionality while signalling to the mobile device.

As described above, the Phone [21] initially acts as the host device. When it is plugged into the docking station [213], it is connected to the main switch [23] and the hub [26] via the preliminary switch [22]. The preliminary switch [22] is aware that the ID pin of the USB plug attached to the Phone [21] is grounded, and maintains that ground, signalling to the Phone [21] that it may act as the host device. It is therefore aware that the Phone [21] is currently acting as the host device. When the Phone [21] is acting as the host device, the preliminary switch [22] uses the connection [210] to the main switch [23], which switches to receive it and route communications on to the upstream port of the hub [26].

When a new host-capable device [25] (the "Laptop") is connected to the USB Type-A port on the docking station (if the docking station has such a USB Type-A port), the preliminary switch [24] detects the new connection and connects the Laptop [25] to the main switch [23] via the connection [211]. The main switch [23] detects that the Laptop [25] is connected, and because it is connected to a USB Type-A port, it knows that the Laptop [25] will take priority over the Phone [21] as the host device. The main switch [23] then checks whether the Phone [21] is currently executing an operation requiring uninterrupted connection to the dock [213] or peripherals [27], such as a data transfer, for example to an external storage peripheral. If so, it may simply wait until the operation has completed, or it may send a signal to the Phone [21], to inform the user that the operation is ongoing and wait for the operation to complete or the user to cancel it.

Once the operation is complete, or if it was found that no ongoing operation was executing, such that the Phone [21] can be removed from acting as the host device, the main switch [23] signals to the first preliminary switch [22] that it should switch to connection [28] directly to a downstream port of the hub [26] so that the Phone [21] is connected as a peripheral. The first preliminary switch [22] removes the Ground connection from the ID pin of the USB plug attached to the Phone [21], which signals to the Phone [21] that it should no longer act as the host device. The first preliminary switch [22] then switches to use the connection [28] to the hub [26]. This switch may cause a momentary interruption, but no longer. This series of actions constitutes the signal to the Phone [21] that it should no longer act as the host device. The Phone [21] then acts as a peripheral without having to be unplugged from the dock [213] and the hub [26] is not aware of the change of host device as it is still receiving host signals through the same connection [212]. The Laptop [25] is thus connected by preliminary switch [24] via connection [211] to main switch [23] and via connection [212] to the upstream port of hub [26] to have control of the peripherals as the host device.

When the Laptop [25] is unplugged, the same process occurs in reverse. The second preliminary switch [24] senses that the Laptop [25] has been unplugged and sends a signal to the main switch [23] that the host device has been unplugged. The main switch then determines that the Phone [21] can act as the host device and sends a signal to the first preliminary switch [22] over connection [210]. This triggers the first preliminary switch [22] to switch from its connection [28] to the hub [26] to connection [210] to the main switch [23]. It then grounds the ID pin of the USB plug connected to the Phone [21], signalling the Phone [21] that it should now act as host device.

In an alternative embodiment, where the input ports of the docking station use the USB Type-C connector, initially, the Phone [21] is connected to the dock [213] via a USB Type-C connector and acts as the host device. This means that the CC line between the Phone [21] and the dock [213] is connected to a pull-up resistor in the Phone [21]. The preliminary switch [22] is able to detect that the voltage of the connection is high and so switches to connection [210] to the main switch [23], which receives it and routes communications via connection [212] to the upstream port on to the hub [26].

In this case, a mobile device such as a Tablet is connected to another USB Type-C input port on the docking station. When the new mobile device (hereinafter the "Tablet") [25] is connected, the preliminary switch [24] detects the new device. As part of the handshaking procedure and the detection of the connection, the preliminary switch [24] detects the voltage of the CC connection to the Tablet [25] and, if it is high, indicating that the Tablet [25] is capable of acting as a host device, the preliminary switch [24] switches to use the connection [211] to the main switch [23]. The main switch [23] detects the new connection and, once again, first checks whether the Phone [21] is currently executing an operation requiring uninterrupted connection to the dock [213] or peripherals [27], as described above.

Once the operation is complete, or if it was found that no ongoing operation was executing, such that the Phone [21] can be removed from acting as the host device, the main switch [23] signals to the first preliminary switch [22] that it should switch to the direct connection [28] to the hub [26].

The first preliminary switch [22] switches its end of the CC connection to the Phone [21] to its pull-up resistor, indicating that it is now acting as host device, as opposed to the Phone [21]. This signals to the Phone [21] that it should no longer act as the host device. The first preliminary switch [22] then switches to use the connection [28] to the hub [26]. This switch may cause a momentary interruption, but no longer. This series of actions constitutes the signal to the Phone [21] that it should no longer act as the host. The Phone [21] then acts as a peripheral without having to be unplugged from the dock [213] and the hub [26] is not aware of the change of host as it is still receiving host signals through the same connection [212]. The Tablet [25] is thus connected by preliminary switch [24] via connection [211] to main switch [23] and via connection [212] to the upstream port of hub [26] to have control of the peripherals as the host device.

When the Tablet [25] is unplugged, the same process occurs in reverse. The second preliminary switch [24] switches away from its connection [211] to the main switch [23] and sends a signal telling the main switch [23] to switch to listening to the first preliminary switch [210]. This triggers the first preliminary switch to switch from its connection [28] to the hub [26] to its connection [210] to the main switch [23]. It then switches to using the pull-down resistor at its end of the CC connection to the Phone [21], signalling the Phone [21] that the dock is now acting as a host device. This triggers the Phone [21] to switch its CC connection to the pull-up resistor, indicating that it is now the host device, and also acts as a signal to the Phone [21] that it should now act as host.

The above embodiments assume that the newly connected mobile device becomes the host device. In the first embodiment, this was because the Laptop was connected to a USB Type-A port on the docking station, which, in itself, indicates that the device connected to it must take priority as the host device, as usually only host capable Laptops could be connected to the USB-Type-A port. In the second embodiment, it was assumed that the later connected device (the Tablet), even although it was connected to a similar USB Type-C port, would take priority over the earlier connected device (the Phone). Of course, if another Phone were connected to the second USB Type-C port, it would also be assumed to take priority, as the priority of all devices connected to the same type of port is assumed to be determined by the order in which they were connected in time, with later connected devices taking priority over earlier connected devices. However, it will be appreciated that other ways of determining priority as to which of two or more devices are to be the host device may be used. For example, priority could be based on attributes of each device, such as display size, processor speed, or other attributes or capabilities of each device. Furthermore, the priority could be determined by the user, either by the docking station requesting the user to set a priority for a newly connected device when it is connected, either as simply a highest priority device, or relative to the other devices already connected to the docking station, or by having each mobile device having a preset priority determined by the user stored either in the respective device or in the docking station. Therefore, each time a new device is connected to the docking station, if it is capable of acting as a host device, the docking station could automatically (or based on user input) determine whether it is to be connected as a host device or as a peripheral.

Figure 3:
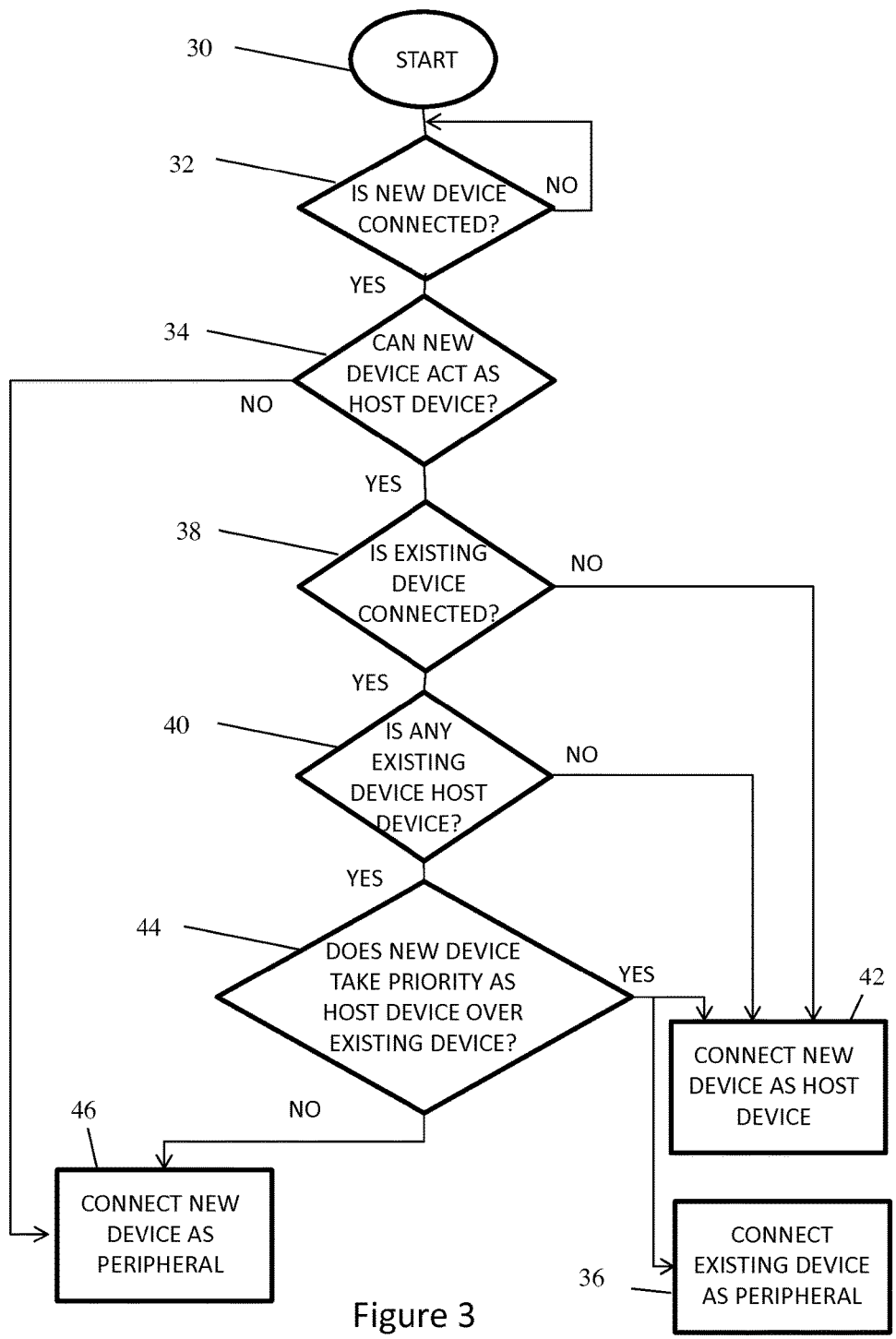
FIG. 3 is a flowchart of a process of the embodiment of FIGS. 1 and 2 when a new mobile device is connected to a docking station.

FIG. 3 shows an example of such a process.

The process starts at step 30, with no host-capable devices connected to the docking station. However, a number of peripherals are attached to the docking station, for example, one or more displays, input devices such as a mouse and keyboard, external storage device and a network connection. The docking station may also be connected to mains power.

At step 32, the docking station determines whether a new mobile device is connected to the docking station. If no new device is found, the docking station keeps monitoring for new devices being connected. The device may, of course, be connected to the docking station using either a wired or a wireless connection.

At step 34, the docking station determines whether the newly connected mobile device has host capabilities by negotiating the status of the newly connected mobile device. This may also include determining whether the connection between the newly connected mobile device and the docking station will allow the newly connected mobile device to act as a host device. This may involve discovering whether the correct terminals of a standard USB cable are plugged in, discovering whether the voltage on the CC connection of a Type-C connector is high or any other method appropriate to the connection. If it is determined that the newly connected mobile device cannot act as a host device, whether due to its capabilities, or because the connection is not suitable for a host device, the newly connected mobile device is connected (at step 46) as a peripheral.

If it is determined that the newly connected mobile device can act as a host device, the docking station determines whether there is an existing mobile device connected, at step 38, and whether, if so, any existing mobile device is acting as a host device, at step 40. If either of these determinations is negative, that is, if there is no existing mobile device connected, or, if there is, none are acting as a host device, then the newly connected mobile device is connected (at step 42) as the host device with control over the peripherals.

If, however, there is an existing device connected as a host device, then, in step 44, the docking station determines whether the newly connected mobile device (which is host-capable) takes priority over the existing device, which is currently the host device. If it is determined that the newly connected mobile device takes priority, then it is connected as the host device (step 42) and the connection of the existing device is changed so that the existing device is connected as a peripheral (step 36). If it is determined that the newly connected device does not take priority, then the existing device remains connected as the host device, and the newly connected mobile device is connected as a peripheral (at step 46).

As mentioned above, determining whether the newly connected mobile device takes priority can be made in a number of different ways. For example, each host-capable device connected to the dock may displace the previous host device and become the host device itself without any further hierarchy or consultation with the user. In this case, the priority is relative and is based on the temporal order in which the devices were connected. As a result, once the docking station ascertains that the newly connected mobile device is host-capable, it automatically turns off the host capability of the existing device. The docking station may then re-negotiate the status of the existing device in order to find out if it is capable of acting as a peripheral according to the capabilities of the device and the connection. If so, it is switched to act as a peripheral and the newly connected mobile device is then allowed to act as the host device. Alternatively, the docking station may already know whether the existing device can act as a peripheral, or may assume that it can and automatically connect it as a peripheral.

The priority may be determined by considering one or more attributes of each device and comparing them to determine which one should be the host device. As mentioned above, this may be based on the display (screen) size of the device or the processing power of the device. The priority could alternatively be determined by a preset priority which was preset by the user, for example on a relative basis, by giving each possible device a priority number so that the highest (or lowest) connected device always becomes the host device, or an absolute priority number, with some types of devices having particular priorities, e.g. a Laptop has a very high priority, a Tablet has a high priority, and a Phone has a low priority. In this case, if two (or more) devices of the same type are connected then their priorities may be the same and another basis for discrimination may need to be used, perhaps only between the conflicting devices. However, alternatively, or additionally to the above, the user could simply be asked to input which device should be the host device, or whether the newly connected device should supersede the existing device as the host device, or whether he agrees with the automatic choice.

Figure 4:
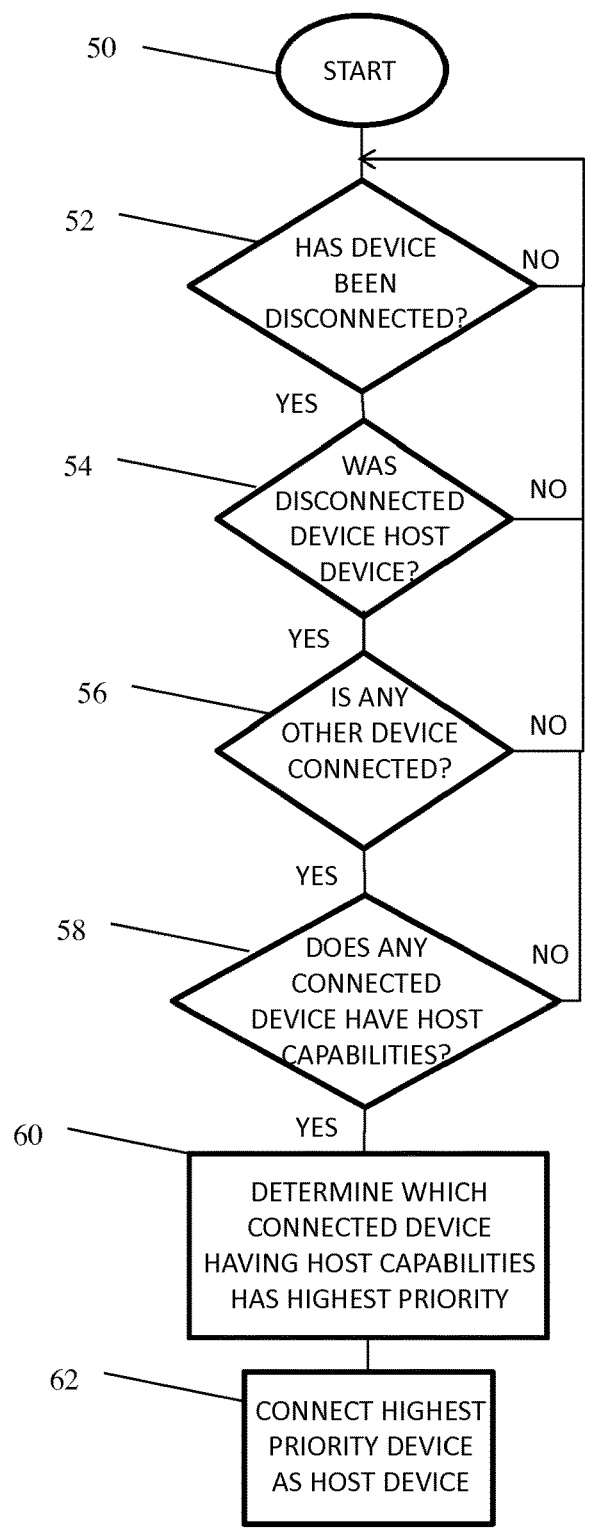
FIG. 4 is a flowchart showing a process of the embodiment of FIGS. 1 and 2 when an existing mobile device is disconnected from a docking station.

FIG. 4 shows a similar process to that of FIG. 3, but where a device is disconnected from the docking station. The process starts at step 50 and continues to step 52, where the docking station determines whether an existing mobile device has been disconnected from the docking station. If no disconnection is determined, the docking station keeps monitoring for devices being disconnected.

At step 54, if it has been found that a device has been disconnected, the docking station determines whether the disconnected mobile device was acting as the host device. If not, the docking station continues monitoring for devices being disconnected. If it is determined that the disconnected mobile device was acting as the host device, the docking station then determines (step 56) whether there are any other devices already connected to the docking station, and, if so, whether (step 58) any of them have host capabilities. If either of these determinations is negative, that is, if there are no existing devices connected, or, if there are, none are capable of acting as a host device, then the docking station continues monitoring for devices being disconnected.

If, however, there are existing devices connected that are capable of acting as a host device, then, in step 60, the docking station determines which of the host-capable existing connected devices has the highest priority to act as the host device. Of course, if there is only one host-capable existing connected device, then it has the highest priority and is connected as the host device (step 62). However, if there is more than one host-capable existing connected device, then their relative (or absolute) priorities must be compared to determine which one is to be connected as the host device. This can be done in the manner discussed above, whether by comparing two devices to determine which one is higher, and then possibly comparing the "winner" of that comparison with another device, and so on, or by comparing all the candidates at the same time.

Although several embodiments have been described in detail above, it will be appreciated that various changes, modifications and improvements can be made by a person skilled in the art without departing from the scope of the present invention as defined in the claims.

I claim:

1. A method for controlling access to one or more peripherals connected to a docking station by a host device connected to the docking station, the method comprising:
   determining, by the docking station, when a new mobile device is connected to a first Universal Serial Bus (USB) Type-C connection input port of the docking station;
   when a new mobile device is determined to be connected to the first USB Type-C connection input port of the docking station, determining, by the docking station, whether the new mobile device is capable of controlling one or more peripherals connected to the docking station;
   if it is determined that the new mobile device is not capable of controlling the one or more peripherals connected to the docking station, determining that the new mobile device is to be connected as a peripheral;
   if it is determined that the new mobile device is capable of controlling the one or more peripherals connected to the docking station, determining whether an existing mobile device connected to a second USB Type-C connection input port of the docking station has control of the peripherals as a host device;
   if it is determined that the existing mobile device connected to the second USB Type-C connection input port of the docking station has control of the peripherals as a host device, determining which of the new mobile device or the existing mobile device has a higher priority to control the peripherals as the host device, wherein the priority of the mobile devices to control the peripherals as the host device is determined based on one or more of:
   attributes of each of the mobile devices;
   user input; and
   a preset priority of each of the mobile devices; and
   providing the determined host device access to control the peripherals.

2. The method according to claim 1, wherein, if it is determined that the new mobile device should be the host device, the method further comprises any one or more of:
   changing the connection of the existing mobile device to be connected as a peripheral; and maintaining charging capabilities for the existing mobile device by the docking station.

3. The method according to either claim 1 or claim 2, whereby, if it is determined that the existing mobile device should be the host device, the method further comprises any one or more of:
   providing continued access to control the peripherals for the existing mobile device;
   connecting the new mobile device as a peripheral; and 40 providing the new mobile device with charging capabilities by the docking station.

4. The method according to claim 2, whereby, if it is determined that the existing mobile device should be the host device, the method further comprises one or more of:
   providing continued access to control the peripherals for the existing mobile device;
   connecting the new mobile device as a peripheral; and providing the new mobile device with charging capabilities by the docking station.

5. The method according to claim 1, wherein determining whether an existing mobile device connected to the docking station has control of the peripherals as a host device comprises:

checking whether the existing mobile device is executing an ongoing process; and if it is determined that the existing mobile device is executing an ongoing process, and that the new mobile device should be the host device, delaying providing the new mobile device as host device access to control the peripherals until the existing mobile device has completed execution of the ongoing process.

6. The method according to claim 1, wherein, if it is determined that the new mobile device should be the host device, the method further comprises requesting confirmation from a user of the existing mobile device that access to control the peripherals should be withdrawn from the existing mobile device, and delaying withdrawal of access to control the peripherals from the existing mobile device until such confirmation has been received.

7. The method according to claim 1, wherein the preset priority of each mobile device is stored either in the corresponding mobile device, or in the docking station.

8. A non-transitory, tangible computer readable medium including executable instructions which, when executed in a processing system, cause the processing system to perform all the steps of a method according to claim 1.

9. A method for controlling access to one or more peripherals connected to a docking station by a host device connected to the docking station, the method comprising:
determining, when a mobile device is disconnected from a first Universal Serial Bus (USB) Type-C connection input port of the docking station, whether the disconnected mobile device was acting as a host device controlling the one or more peripherals connected to the docking station;
when a mobile device acting as a host device is determined to have been disconnected from the first USB Type-C connection input port of the docking station, determining whether any other mobile device capable of controlling the one or more peripherals is connected to a second USB Type-C connection input port of the docking station;
if it is determined that more than one mobile device capable of controlling the one or more peripherals is connected to USB Type-C connection input ports of the docking station, determining which of the connected mobile devices capable of controlling the one or more peripherals has a higher priority for acting as a host device, wherein the priority of the mobile devices to act as the host device is determined based on one or more of:
attributes of each of the mobile devices;
user input; and
a preset priority of each of the mobile devices; and
providing the highest priority connected mobile device access to control the peripherals as the host device.

10. The method according to claim 9, wherein the priority of each mobile device is stored either in the corresponding mobile device, or in the docking station.

11. A non-transitory, tangible computer readable medium including executable instructions which, when executed in a processing system, cause the processing system to perform all the steps of a method according to claim 9.

12. A docking station comprising a plurality of output ports for connection to one or more peripherals, a plurality of Universal Serial Bus (USB) Type-C connection input ports for connection to one or more mobile devices, and a controller for controlling access to the one or more peripherals connected to the output ports and configured to:
determine when a new mobile device is connected to a first USB Type-C connection input port of the docking station;
in response to a determination that a new mobile device is connected to the first USB Type-C connection input port of the docking station, determine whether the new mobile device is capable of controlling one or more peripherals connected to the docking station;
in response to a determination that the new mobile device is not capable of controlling the one or more peripherals connected to the docking station, determine that the new mobile device is to be connected as a peripheral;
in response to a determination that the new mobile device is capable of controlling the one or more peripherals connected to the docking station, determine whether an existing mobile device connected to a second USB Type-C connection input port of the docking station has control of the peripherals as a host device;
in response to a determination that the existing mobile device connected to the second USB Type-C connection input port of the docking station has control of the peripherals as a host device, determine which of the new mobile device or the existing mobile device has a higher priority to control the peripherals as the host device, wherein the priority of the mobile devices to control the peripherals as the host device is determined based on one or more of:
attributes of each of the mobile devices;
user input; and
a preset priority of each of the mobile devices; and
provide the determined host device access to control the peripherals.

13. The docking station according to claim 12, wherein the controller comprises a main switch, a hub coupled to the main switch and to the plurality of output ports, and a plurality of preliminary switches, each preliminary switch coupled to an input port, the main switch and the hub.

14. The docking station according to claim 13, wherein a first preliminary switch determines when a mobile device is newly connected to an input port of the docking station and whether the mobile device is capable of acting as a host device and, if so, activates a connection between the input port and the main switch, the main switch determines whether an existing mobile device is connected to an input port of the docking station and has control of the peripherals as a host device, if it determines that an existing mobile device is connected to the docking station as a host device, determines whether the existing mobile device or the newly connected mobile device has a higher priority to act as the host device and, if it determines that the newly connected mobile device has the higher priority to act as the host device, it controls the preliminary switch connected to the input port to which the existing mobile device is connected, to connect the input port to which the existing mobile device is connected to the hub, whereby the existing mobile device no longer has control of the peripherals.

15. A docking station comprising a plurality of output ports for connection to one or more peripherals, a plurality of Universal Serial Bus (USB) Type-C connection input ports for connection to one or more mobile devices, and a controller for controlling access to the one or more peripherals connected to the output ports and configured to:
determine, when a mobile device is disconnected from a first USB Type-C connection input port of the docking station, whether the disconnected mobile device was acting as a host device controlling the one or more peripherals connected to the docking station;

in response to a determination that a mobile device acting as a host device has been disconnected from the first USB Type-C connection input port of the docking station, determine whether any other mobile device capable of controlling the one or more peripherals is connected to a second USB Type-C connection input port of the docking station;

in response to a determination that more than one mobile device capable of controlling the one or more peripherals is connected to USB Type-C connection input ports of the docking station, determine which of the connected mobile devices capable of controlling the one or more peripherals has a higher priority for acting as a host device, wherein the priority of the mobile devices to act as the host device is determined based on one or more of:

attributes of each of the mobile devices;

user input; and a preset priority of each of the mobile devices; and provide the highest priority connected mobile device access to control the peripherals as the host device.

16. The docking station according to claim 15, wherein the controller comprises a main switch, a hub coupled to the main switch and to the plurality of output ports, and a plurality of preliminary switches, each preliminary switch coupled to an input port, the main switch and the hub.

17. The docking station according to claim 16, wherein a first preliminary switch determines when a mobile device is newly connected to an input port of the docking station and whether the mobile device is capable of acting as a host device and, if so, activates a connection between the input port and the main switch, the main switch determines whether an existing mobile device is connected to an input port of the docking station and has control of the peripherals as a host device, if it determines that an existing mobile device is connected to the docking station as a host device, determines whether the existing mobile device or the newly connected mobile device has a higher priority to act as the host device and, if it determines that the newly connected mobile device has the higher priority to act as the host device, it controls the preliminary switch connected to the input port to which the existing mobile device is connected, to connect the input port to which the existing mobile device is connected to the hub, whereby the existing mobile device no longer has control of the peripherals.

* * * * *